Oct. 18, 1927. 1,646,365
O. C. WILLIS
APPLICATOR FOR SURGICAL DRESSINGS AND THE LIKE
Filed July 21, 1923
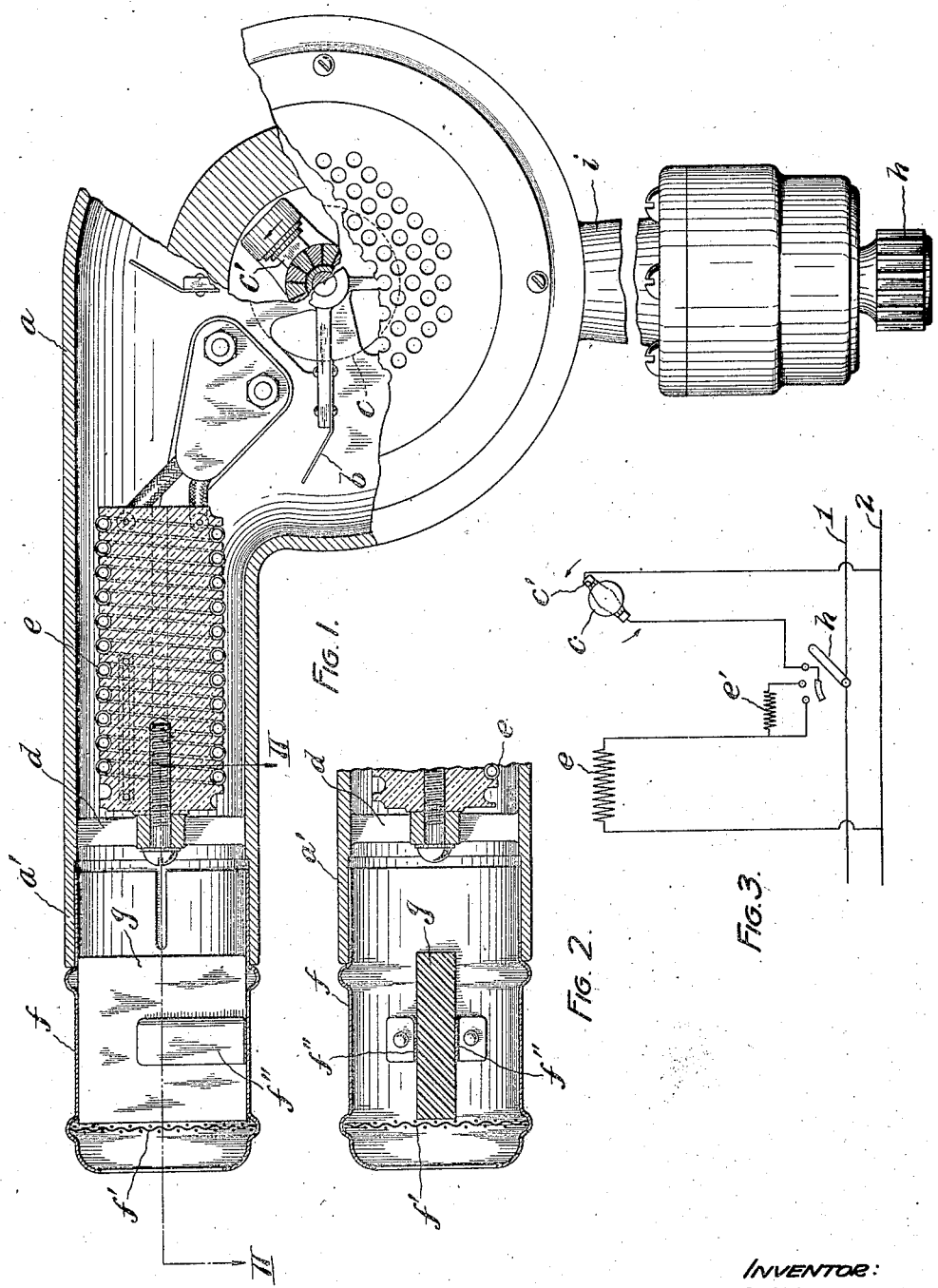
INVENTOR:
OLO C. WILLIS
BY
ATTORNEY.

Patented Oct. 18, 1927.

1,646,365

UNITED STATES PATENT OFFICE.

OLO CROCKETT WILLIS, OF CLEVELAND, OHIO, ASSIGNOR TO THE P. A. GEIER COMPANY, OF CLEVELAND, OHIO, A CORPORATION OF OHIO.

APPLICATOR FOR SURGICAL DRESSINGS AND THE LIKE.

Application filed July 21, 1923. Serial No. 653,017.

My invention relates to improvements in an applicator for surgical dressings and the like, and has for its object an improved procedure and apparatus primarily designed for the dressing of irritated surfaces upon the skin or burns with a suitable solid melting at low temperature, such as "ambrine". My invention may be applied to other uses than the one specifically described hereafter for the purposes of illustration, such as the application of various liquid or semi-liquid medicaments, with or without heat.

Ambrine is a solid at normal atmospheric temperatures, but becomes as fluid as water when heated between 140° to 150° F.; very quickly passing from the solid to liquid state or vice versa. The accepted method of application hitherto has been to heat a quantity of ambrine above its melting point sufficiently to permit its application to the burn by means of a brush. This form of treatment was extensively used by surgeons of the Regular Army during the World War for the treatment of irritations or burns resulting from mustard gas, or scalds from hot water and steam.

Shortly after the application of ambrine, which hardens over the injured surface at normal temperatures, wound secretions form under the dressing thus lifting it from the burned or scalded area to form an outer shell, and to this fact is the ease of redressing attributed without harming the new epithelial cells that quickly and naturally form.

I have discovered that it is preferable to apply the ambrine or other dressing or medicament as a fine spray so that it may be more evenly distributed and quickly cooled over the irritated, burned or scalded surface of skin. Moreover, it is important that the temperature of the substance applied shall be quickly elevated and lowered, so that the dressing may be applied painlessly without inflaming the affected surface.

To accomplish these results I employ air currents impelled with considerable velocity and heated or not, at pleasure of the surgeon, whereby the ambrine or other substance may be melted, quickly and evenly distributed as a thin dressing over the injured surface and as quickly cooled, thereby affording instant relief and a temporary aseptic dressing or covering.

The means preferably employed by me for accomplishing these results are embodied in an enclosed type of electric fan equipped with an electric heater operated at will, whereby hot and cold currents of air may be delivered from the nozzle, as conditions may require. A removable container for the substance to be applied, such as ambrine above mentioned, is furnished for the nozzle, whereby the substance may be quickly melted, applied to the injured surface and cooled, both within the container and over the flesh or skin. Details of suitable apparatus for practicing my invention may best be explained by making reference to the accompanying drawings, wherein:

Figure 1 is a view partly in side elevation and partly in section of such apparatus for practicing the method set forth.

Fig. 2 is an enlarged view of the removable container, and

Fig. 3 is a diagrammatic view of the circuit arrangement of the apparatus.

Throughout the several figures of the drawings I have employed the same characters of reference to indicate similar parts.

Within the casing $a$ there is provided a rotary fan $b$ actuated preferably by a small electric motor $c$ equipped with partially rotatable brushes $c'$ for the purpose of regulating the speed of the motor. The fan casing $a$ terminates in a cylindrical nozzle $a'$ wherein is positioned a support $d$ mounting an electric heating unit $e$ about which the air currents may be peripherally impelled by the fan. Within the end of the nozzle there is removably inserted a container $f$ which is adapted to receive the particular substance under treatment, as ambrine mentioned above. A wire netting $f'$ is positioned adjacent to the open mouth of the container, while supports or fingers $f''$ are provided for grasping the sides of the block $g$ of ambrine. Instead, if a liquid medicament is to be applied, a felt pad soaked with such liquid may be inserted in substitution for the block of ambrine.

It is apparent that any substance positioned within the container will be subjected on all sides to the action of the air currents emanating from the fan, whether hot or cold, depending upon the excitation of the electric heating coil.

Referring to Fig. 3, it will be seen that the switch $h$, shown in Fig. 1 positioned at the end of the handle $i$, is adapted to connect either the motor $c$ directly with the exciting circuit 1, 2, or upon the further actuation of said switch, the heating coil $e$ may be connected in circuit through a resistance $e'$, or directly in shunt relation with the motor.

It will be understood that with the motor solely connected in circuit, a cooling current of air will be delivered through the nozzle of the appliance, while a warm current of air will be produced upon connecting in the heating coil through resistance $e'$; this changing to a much hotter current of air with the resistance cut out of circuit. The diagram, of course, is intended to show merely the elementary circuit relations, and, in addition, the rotatable adjustment of the brushes $c'$, which may be advanced or retracted with respect to the armature.

As well understood in the art, such shifting of the brushes will effect a material variation in the speed of the motor and its connected fan. Accordingly, this feature affords additional means for varying the temperature of the air currents, which will be more highly heated at the lower speed range of the motor; the heat being gradually tempered by the additional volumes of air supplied at the higher speeds.

The procedure of applying a dressing may comprise the initial cooling and drying of the injured surface by a brief application of cool air, after which the heating coil will be cut into circuit and the melted ambrine will be distributed evenly over the burned area by the heated air; thereafter being quickly cooled, if desired, by another current of cool air. The temperature of the air may be closely regulated in accordance with the particular requirements of the case.

Having now described apparatus suitable for practicing my invention, I claim as new and desire to secure by Letters Patent, the following:

1. The herein described method of applying a surgical dressing or covering, which consists in subjecting a suitable substance to currents of air sufficiently elevated in temperature to melt said substance and thereby apply it to the injured surface, substantially as set forth.

2. The herein described method of applying a surgical dressing or covering, which consists in subjecting a suitable sumstance to currents of air impelled at considerable velocity and sufficiently elevated in temperature to melt said substance, and conveying and cooling said substance upon the injured flesh or skin, substantially as set forth.

3. The herein described method of applying substances such as ambrine, which consists in subjecting the substance to heated air current impelled at considerably velocity against the injured surface, evenly applying the substance in melted form over the injured surface, and subjecting said substance and dressing thus produced to cooling air currents, substantially as set forth.

4. The combination with an enclosed fan, of means for rapidly driving the same, means for heating the air currents produced by said fan as occasion requires, and a removable container for solids to be melted and sprayed in liquid form positioned before the nozzle of the fan and adapted to support a substance for delivery by the heated air currents, substantially as set forth.

5. In apparatus of the class described, the combination with an enclosed rotary fan, of means for effecting its rotation, means for variably heating the air currents produced by said fan, a removable container for solids to be melted and sprayed in liquid form positioned at the nozzle of the fan, and supporting means within said container for retaining the substance to be heated intermediately of the air currents, substantially as set forth.

6. In apparatus of the class described, the combination with a fan chamber and its rotary fan, of a motor for impelling said fan, an electric heating coil positioned within the discharge nozzle, a removable container adapted to be inserted within said nozzle, and supporting means for solids to be melted and sprayed in liquid form interiorly of said container for retaining the substance to be heated centrally of the air currents, substantially as set forth.

7. In apparatus of the class described, the combination with a fan chamber and its rotary fan, of an electric motor connected to drive said fan, shiftable brush mechanism adapted to vary the speed of said motor, an electric heating coil positioned within the discharge nozzle of the fan, a removable container adapted to be applied to said nozzle beyond the coil, and supporting means for a suitable solid to be melted and sprayed in liquid form, positioned interiorly of said container adapted to maintain the substance to be heated centrally of the air currents, substantially as set forth.

In testimony whereof I do now affix my signature.

OLO CROCKETT WILLIS.